United States Patent [19]

Brand

[11] 4,019,527
[45] Apr. 26, 1977

[54] MODULATING FLOW CONTROL VALVE
[75] Inventor: Warren H. Brand, Blue Bell, Pa.
[73] Assignee: Yarway Corporation, Blue Bell, Pa.
[22] Filed: Mar. 3, 1975
[21] Appl. No.: 554,401
[52] U.S. Cl. .............................................. 137/115
[51] Int. Cl.² ...................................... G05D 11/00
[58] Field of Search .............. 137/116, 115, 116.5, 137/117, 116.3

[56] References Cited
UNITED STATES PATENTS

| | | | |
|---|---|---|---|
| 2,445,544 | 7/1948 | Trautman | 137/117 |
| 3,007,481 | 11/1961 | Frost | 137/116 |
| 3,068,882 | 12/1962 | Odendahl | 137/116 |
| 3,318,321 | 5/1967 | Odendahl | 137/117 |
| 3,604,446 | 9/1971 | Brooks | 137/115 |
| 3,640,359 | 2/1972 | Clark et al. | 137/115 |
| 3,723,025 | 3/1973 | Coakley | 137/115 |

*Primary Examiner*—William R. Cline
*Assistant Examiner*—H. Jay Spiegel
*Attorney, Agent, or Firm*—John W. Logan, Jr.

[57] ABSTRACT

The preferred embodiment of the invention disclosed herein includes a main check valve responsive to the rate of flow of fluid to a demand system and a bypass valve metering the flow of fluid to a bypass system. In the closed position of the main check valve, the bypass valve is in a fully open position whereby a predetermined minimum flow from a pressure source is maintained; in an intermediate position of the main check valve responsive to the predetermined minimum rate of flow thereacross, the bypass valve is closed and remains closed from the intermediate position of the main check valve to the fully open position. Operation of the bypass valve is controlled by fluid pressure from the inlet side of the main check valve which acts on a piston associated with the bypass valve and the buildup of pressure is controlled by a pilot valve.

19 Claims, 5 Drawing Figures

MODULATING FLOW CONTROL VALVE

The invention disclosed herein relates to a flow control valve assembly and, more particularly to a modulating flow control valve assembly including a bypass valve for dividing the input flow to the valve assembly between two output systems whereby a predetermined minimum input flow is maintained.

Various fluid systems include a pressure fluid supply which is to be divided between two output systems in accordance with flow changes in one of the latter systems. For example, steam generating plants generally include a centrifugal feed water pump providing an output flow to a feed water heater. In these plants, it is usual to provide for the continuous operation of the pump and to utilize a check valve whose position is responsive to the rate of flow from the pump to the heater in accordance with the demand flow requirements of the latter. Flow through the pump also functions to cool it so that during periods of relatively low demand from the heater when the output of the pump falls below a minimum flow rate it is possible for the pump to overheat. Accordingly, when the demand from the heater falls below the noted minimum, it is usual to maintain the output of the pump at the noted minimum rate and to recirculate the excess back to the pump. By recirculating a portion of the output, the pump is protected from overheating.

Recirculation of the output from the pump can be provided by manual operation of a bypass valve which, of course, is relatively expensive and unreliable or could be provided by a bypass valve controlled by a flow meter detecting flow on the inlet side of the pump. When the flow on the inlet side of the pump drops below the minimum rate required to cool the pump, the flow meter causes the bypass valve to be opened maintaining the pump output and diverting that portion of the flow not required by the feed water heater to a sump connected to the inlet of the pump. Such an arrangement involves relatively complex and expensive apparatus and has not been found to be satisfactory. An alternative to either of the techniques described above and one which has been found to be generally satisfactory for most systems involves the use of a modulating flow control valve assembly including a main check valve whose position is responsive to the rate of flow from the pump to the heater and a bypass valve for recirculating flow back through the pump during periods of low demand by the heater. While valve assemblies of this type are known in the art, they are not entirely satisfactory in certain systems, particularly, in large steam generating plants where the minimum flow requirement through the pump is relatively large. One problem with known valve assemblies utilized in these applications is caused by the on-off operation of the bypass valve which causes abrupt increases in the output of the pump. These abrupt increases in the output of the pump provide a water hammer effect, that is, sudden surges in the output flow which may be detrimental to the pump, the piping system and the remainder of the fluid control system.

Another problem with modulating flow control valve assemblies of the type noted above results from the use of a mechanical link arrangement between the main check valve and the bypass valve which operates the bypass valve in response to the movement of the main check valve. Use of mechanical links is somewhat complex and expensive, but, more importantly, is not entirely dependable. Malfunction of the mechanical link can result in both the main check valve and the bypass valve being in closed positions whereby the flow through the pump falls below the minimum required to prevent overheating.

Accordingly, it is an object of this invention to provide a modulating flow control valve assembly including a check valve and a bypass flow control valve wherein flow through the bypass valve gradually decreases with increases in flow through the check valve.

It is another object of this invention to provide a modulating flow control valve assembly including a check valve and a bypass flow control valve wherein operation of the bypass valve is controlled without the use of mechanical links.

It is yet another object of this invention to provide a modulating flow control valve assembly that assures a minimum output from a pump or other source of fluid.

Finally, it is an object of this invention to provide a modulating flow control valve assembly that is simple, rugged and economical and which is particularly useful in steam generating plants for maintaining a minimum output from a feed water pump.

These and other objects of this invention are accomplished by providing a valve assembly including a check valve movable between a closed position and a fully open position in response to the rate of flow of fluid from a pump or other pressure source to a demand system. The check valve also includes an intermediate position wherein the flow thereacross corresponds to a predetermined or preselected minimum output flow from the pump. Also included is a bypass valve having a fully open position when the check valve is in its closed position and a closed position when the check valve is in its intermediate position in response to the predetermined minimum rate of flow through the check valve. Operation of the bypass valve is controlled by fluid pressure from the inlet side of the check valve acting on a piston associated with the bypass valve and by a pilot valve controlling te buildup of fluid pressure on the piston.

More particularly the bypass valve is formed with a slidable conduit communicating between the inlet side of the check valve and the working face of the piston, which is slidable in a pressure chamber that communicates with the recirculation system. The pilot valve controls the flow between the pressure chamber and the recirculation system whereby the pressure chamber is either vented or accumulating fluid. Even more particularly, the pilot valve is controlled by a stem on the check valve which cooperates with the slidable conduit to keep the pilot valve open or to allow it to close in response to forces developed by fluid pressure or by a spring member.

For a better understanding of the invention, reference is made to the following description of a preferred embodiment taken in conjunction with the figures of the accompanying drawing, in which.

Referring to the drawings, there is illustrated a modulating flow control valve assembly 10 particularly adapted to be used in a steam generating system for controlling the output flow of a feedwater pump to a feedwater heater. It should be understood, however, that a valve assembly in accordance with this invention is usable between other pressure sources and demand systems of the type wherein the pump is continuously operative and wherein the demand system has a variable flow requirement. However, to simplify the description of a preferred embodiment of the invention, reference will be made to a pump and a heater. Valve assembly 10 includes a main check valve 12 responsive to the flow of fluid from the pump to the heater and a bypass valve 14 for controlling the flow of fluid from the pump to a recirculation system such that a predetermined or preselected minimum output flow from the pump is maintained even if the main check valve is fully closed. Both the main check valve 12 and the bypass valve 14 are contained in a valve body 16 formed with an inlet opening 18 and an outlet opening 20, the former communicating with the discharge port on the pump and the latter communicating with the heater. The top of the valve body 16, as viewed in the drawing, is formed with a cylindrical boss 22 to which is removably secured a closure member 24 through the use of shear studs 26. Various other fasteners can be used to secure the closure member 24 to the boss 22 but it is noted that the closure member is preferably easily removable for access to the interior of the valve body 16. Formed on the bottom of the valve body 16, as viewed in the drawing, is a second cylindrical boss 28 which is also covered by a suitable closure member 30 secured thereto by threaded fastener assemblies 32 preferably studs and nuts. Use of threaded fastener assemblies allows the removal of the closure member 30 to provide access to the interior of the valve body 16. A radial port 34 is formed through cylindrical boss 28 and is connected to the sump supplying the pump or is otherwise connected to the recirculation system.

The main check valve 12 is located between the inlet opening 18 and the outlet opening 20 and includes an internal boss 36 formed with a radial opening 38 communicating with the inlet opening and a valve seat 40. Forming the remainder of the main check valve 12 is a valve disc member 42 formed with an enlarged diameter flange portion 44 having a diameter greater than the diameter of the valve seat 40 so that the bottom surface 46 cooperates with the valve seat to allow or prevent the flow of fluid thereacross. Extending downwardly, as viewed in the drawing, and inwardly toward the longitudinal axis of the disc member 42 is a first tapered surface 48 and a second tapered surface 50, the latter terminating adjacent a generally cylindrical sleeve portion 52. In operation the main check valve 12 is controlled by the pressure differential across the valve seat 40 so that its position is controlled by the demand flow requirements of the heater. When the main check valve 12 opens, valve disc member 42 moves upwardly, as viewed in the drawing, so that the bottom surface 46 rises from the valve seat 40. When the valve disc member 42 rises to the dotted line position illustrated in FIG. 1 of the drawing, that is, when it has moved a distance D, the valve is opened to an intermediate position, which position is responsive to flow to the heater equal to the predetermined or preselected minimum output flow of the pump. By changing the angle of the surface 48, this preselected minimum flow may be varied.

At this point it is merely noted that the valve disc member 42 is formed with an internal flow passage 54 extending through the second inclined surface 50 and down through cylindrical sleeve portion 52 so that it communicates with the bypass valve 14. Movement of the valve disc member 42, is guided by a stem member 56 having a hexagonally shaped portion 58 extending upwardly from the top of the disc member and into a complimentary hexagonal opening formed in a boss 60 extending downwardly from the closure member 24. Use of the hexagonal stem portion 58 and the hexagonal opening in the boss 60 provides suitable bearing engagement between these members and also prevents rotation of the stem member and, accordingly, the disc member. A compression spring 64 bears between the end surface of the closure member 24 and the end surface of the valve disc member 42 and biases the disc member downwardly, as viewed in the drawing, so that the surface 46 normally seats on the valve seat 40. For purposes to be made clear hereinafter, the stem member 56 further includes a generally cylindrical reduced diameter portion 66 extending downwardly through the internal flow passage 54 and terminating in a bearing surface 67 extending below, as seen in the drawing, the end of cylindrical sleeve portion 52 of the valve disc member. The bearing surface 67 of the reduced diameter stem portion 66 is formed with a V-shaped groove 68 extending diametrically thereacross for a purpose which will also be explained hereinafter.

Figure 3:
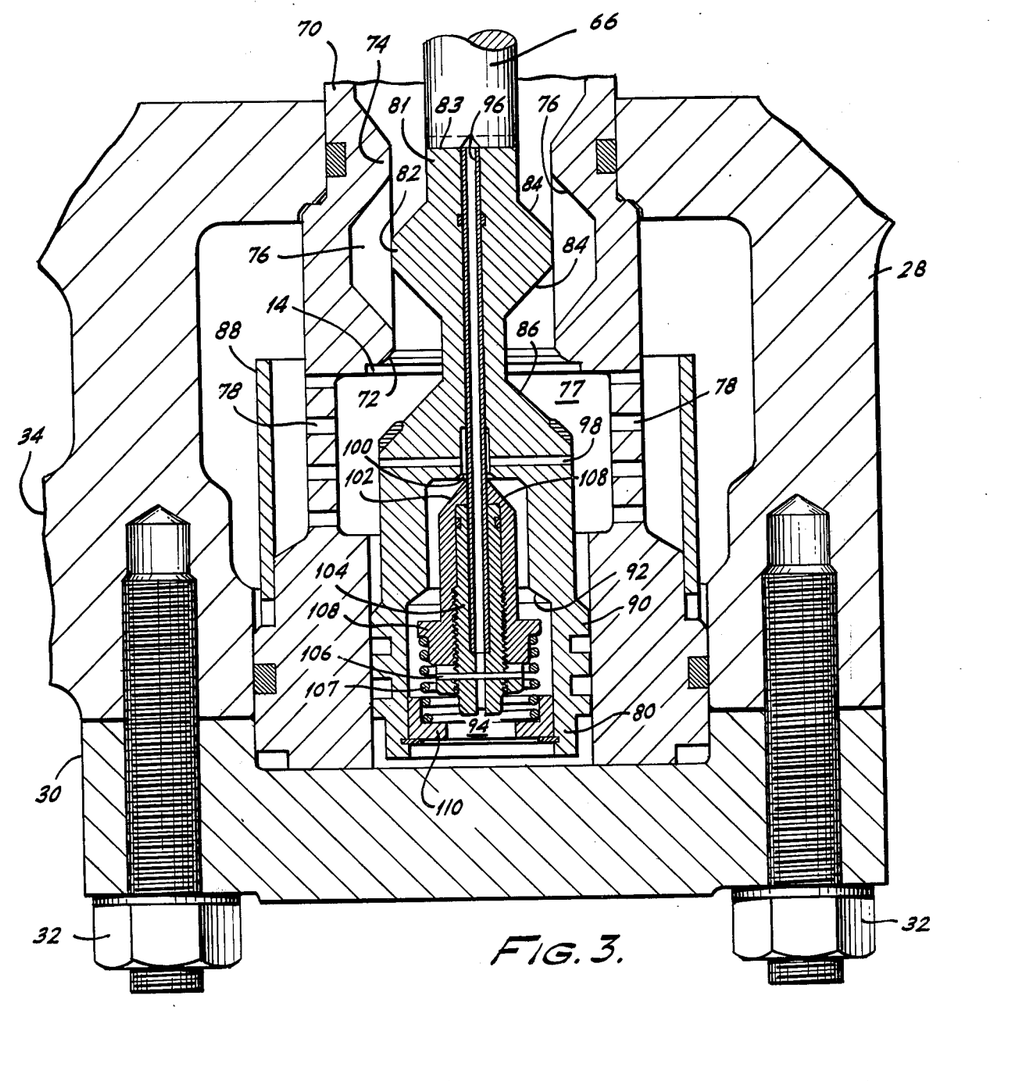
FIG. 3 is an enlarged sectional view of the bypass valve illustrated in FIGS. 1 and 2, illustrating its fully open position.
Figure 4:
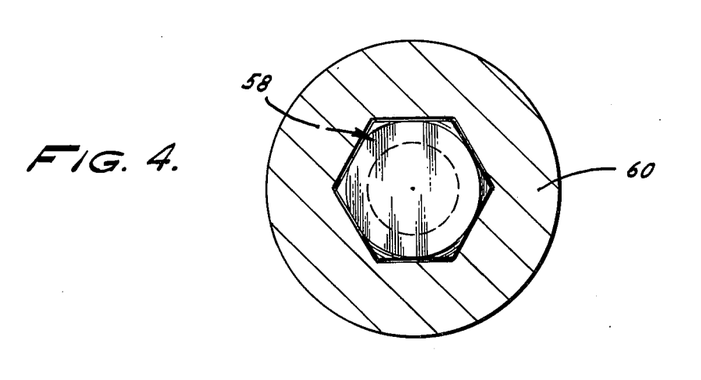
FIG. 4 is a sectional view taken along the line 4—4 of FIG. 1.

Extending upwardly from the end surface of the closure member 30 is a bushing 70 which extends through cylindrical boss 28 and the upper end of which is received within the sleeve portion 52 of the valve disc member 42. The sleeve portion 52 is formed with an interior bearing surface 71 that rides along the outer surface of the bushing 70 and also guides the movement of the valve disc member 42. As clearly seen in the drawing, the interior of the bushing communicates with the internal flow passage 54 and thus with the radial opening 38 and the inlet opening 18. Referring particularly to FIG. 3 of the drawing the bypass valve 14 can be seen to include a valve seat 72 formed at the bottom, as viewed in the drawing, of a reduced diameter portion 74 formed intermediate the ends of the bushing 70. Axially extending slots 76 are formed in the reduced diameter portion 74 and as will be made clear hereinafter serve to throttle the flow of fluid to the valve seat 72. Adjacent the valve seat 72 the bushing is formed with an enlarged diameter portion defining the flow chamber 77 that communicates through a plurality of cross ports 78 with the interior of the boss 28 and, thus, with the recirculation port 34.

Completing the description of the bypass valve 14 a valve member 80 is slidably received in the bushing 70 and is formed with a cylindrical end portion 81 having a bearing surface 83. Adjacent the cylindrical end portion 81 the valve member 80 is formed with a land portion 82 having inclined end faces 84 for cooperating with the slots 76 and throttling the fluid from the inlet opening 18. Spaced from the land portion 82, the valve member 80 is formed with an inclined surface 86 that cooperates with the valve seat 72 for allowing or preventing the flow of fluid from the inlet port 18. As illustrated in FIG. 3 of the drawing, the bypass valve 14 is in a fully open position and allows the flow of fluid from the pump at a rate corresponding to the prior defined predetermined or preselected minimum output of the pump. Fluid from the pump is throttled through the recesses 76 past the valve seat 72 and through the cross ports 78 which further reduce its pressure. Protecting the inner wall of the boss 28 from the forces exerted by the fluid discharged through the cross ports 78 the bushing 70 carries a wear plate 88 spaced from and adjacent to the cross ports.

The desired predetermined minimum flow requirement of the pump to be protected is designed into the valve structure of the present invention and can be easily changed from valve to valve during manufacture by relatively minor modifications to the valves. This can be accomplished by varying the angle and/or lenght of the tapered portion 48 of the check valve disc member 42 and by varying the length of the end portion 81 bypass valve member 80. Shortening the end portion 81 will restrict the degree of opening of the bypass valve when the check valve is closed and thus decrease the bypass flow. This of course should be matched by a corresponding change in the angle and/or length of the tapered portion 48 so that the quantity of flow through the check valve when the bypass valve closes is equal to the flow through the bypass valve when the check valve is closed.

Figure 1:
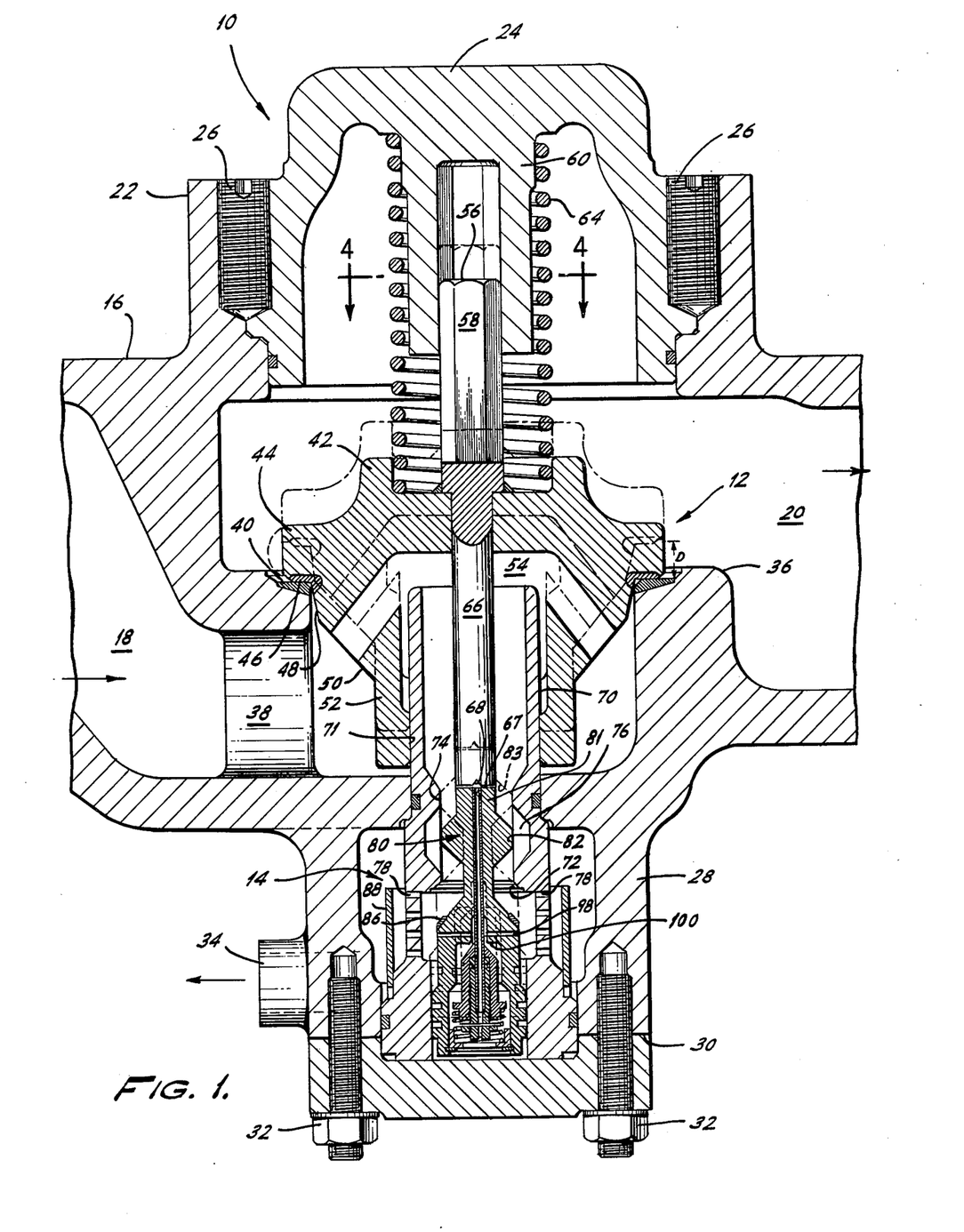
FIG. 1 is a longitudinal sectional view of a valve assembly in accordance with this invention illustrating the closed position of the main check valve and the fully open position of the bypass valve and also illustrating, in dotted lines, an intermediate position of the main check valve and closed position of the bypass valve.
Figure 2:
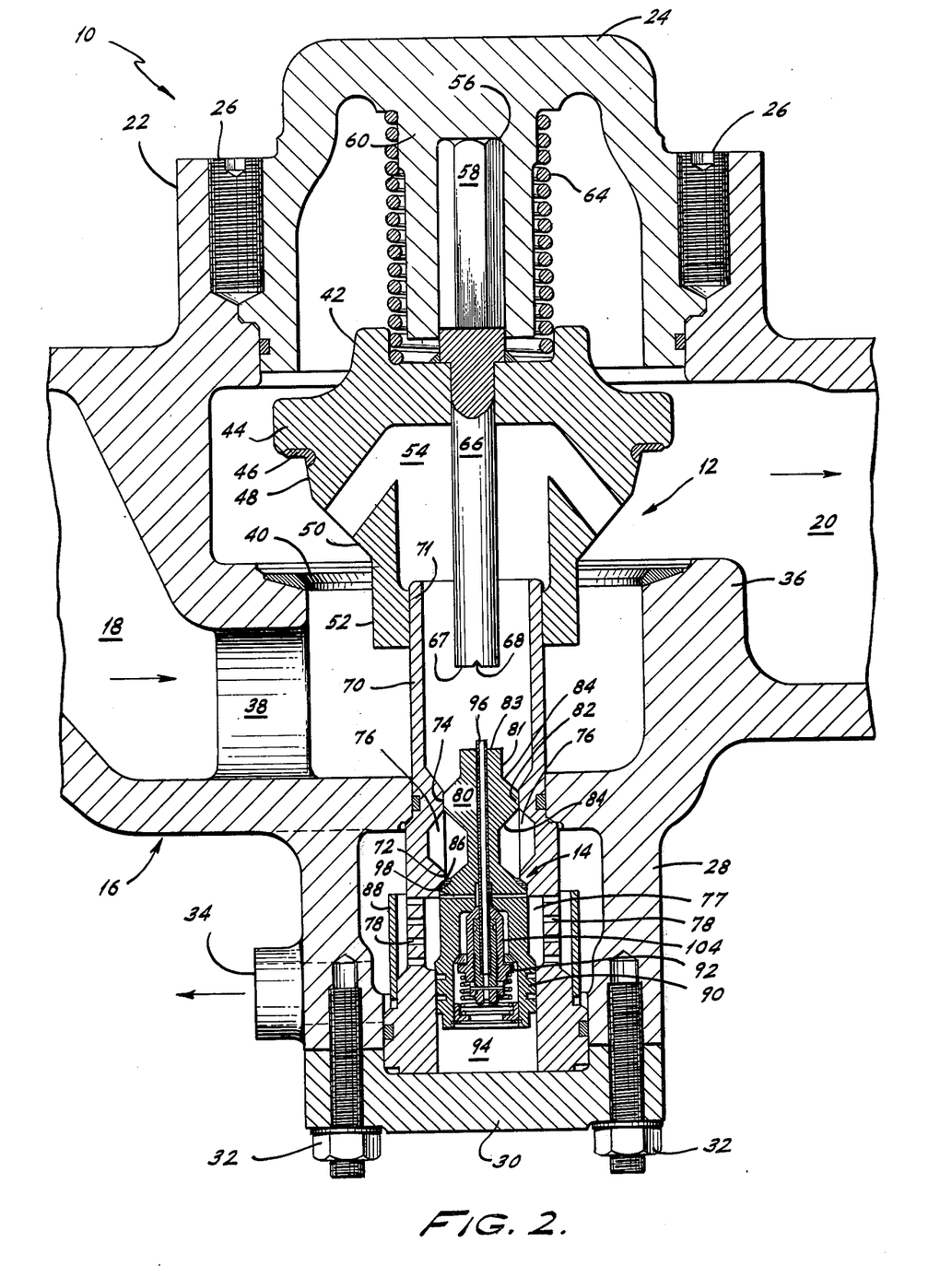
FIG. 2 is a sectional view similar to FIG. 1, but illustrating the fully open position of the check valve and the closed position of the bypass valve.

Referring briefly to FIG. 1 of the drawing, it can be seen that the bypass valve has a close position, illustrated in dotted lines, wherein the valve member has moved to a position wherein the inclined surface 86 bears on the valve seat 72 and the flat surface on land 82 is adjacent the reduced diameter portion 74 adjacent the top, as viewed in the drawing, of the slots 76. Movement of the bypass valve 14 between its open and closed positions is controlled in accordance with the position of the main check valve 12 such that the bypass valve is in its fully open position when the main check valve is in its closed position and is in its closed position when the main check valve is in its intermediate position. Accordingly, the inclined surface 86 is spaced from the valve seat 72 a distance equal to the distance D between the bottom surface 46 and the valve seat 40 in the intermediate position of the main check valve. Further it should be clear that the land 82 is spaced from the top of the slots 76 by a distance also equal to the distance D and that the inclined surfaces 84 cooperate with the slots to progressively reduce the flow of fluid through the bypass valve 14 with the progressive increase in flow through the main check valve 12. That is, flow through the bypass valve 14 varies inversely with the flow through the main check valve to maintain the minimum output of the pump.

In order to control the position of the bypass valve 14, the valve member 80 is formed with a piston 90 extending from the inclined surface 86 and slidably received in the bushing 70. The piston 90 is formed with a counterbored opening 92 that forms part of a pressure chamber 94 along with the bushing 70 and the closure member 30. The pressure chamber 94 communicates with the inlet side of the main check valve 12 through a conduit 96 in the form of a hollow rod slidably carried through the valve member 80 and also communicates with the flow chamber 77 through a cross-port 98 formed radially through the valve member. Between the pressure chamber 94 and the cross-port 98, the valve member 80 is formed with a pilot valve seat 100 that cooperates with a pilot valve member 102 for controlling the pressure in the pressure chamber. The pilot valve member 102 is fixedly carried on the conduit 96 by an externally threaded hollow bushing 104 received over the end of the conduit and cooperating with an internally threaded portion formed on the pilot valve member. To prevent rotation of the pilot valve member 102 relative to the bushing 104, both members are formed with radial slots through which a lock pin 106 is placed. A light biasing force tending to seat pilot valve member 102 on the valve seat 100 is provided by a compression spring 107 bearing on a flange 108 on the pilot valve member and on a retaining ring assembly 110 fixed to the end of the valve member 80. Adjusting the position of the bushing relative to the pilot valve member 102 will vary the amount of opening of the pilot valve.

Having described one preferred embodiment of a modulating flow control valve assembly in accordance with the invention, its operation will now be explained. As illustrated in FIG. 1 of the drawing, the main check valve 12 is closed since there is no demand for fluid from the heater connected to the outlet port 18. With the main check valve closed, the surface 46 seats on the valve seat 40 and the bearing surface 67 on the stem 56 is in bearing engagement with the bearing surface 83 on the valve member 80. The reduced diameter portion 66 is of such a length that it retains the valve member 80 in a fully open position, that is, a position wherein the inclined surface 86 is spaced from the valve seat 72 a distance equal to the distance D as is the land 82 from the top end as seen in the drawing, of the slots 76. In addition, the reduced diameter portion 66 of the stem 56 also retains conduit 96 flush with the bearing surface 83 of the valve member 80 so that the pilot valve member 102 is spaced from the pilot valve seat 100. Because of the groove 68 formed in the bearing surface 67 of the reduced diameter portion 66, the conduit 96 communicates with the inlet side of the main check valve 12.

With the pump operative and with the main check valve 12 closed, output fluid from the pump flows through the inlet opening 18, radial opening 38, the flow passage 54 and through the interior of the bushing where its pressure is reduced as it is throttled through the slots 76 and then flows across valve seat 72 into flow chamber 77. From the flow chamber 77, the pressure is again reduced as the fluid flows through the cross ports 78 against the wear plate 88 and into the interior of the cylindrical boss 28 from which it flows through the recirculation port 34, the recirculation system and through the pump. If desired, the pipe connected to the recirculation port 34 can include a restriction for further reducing the pressure of the fluid, but this is dependent on the exact nature of the system in which the valve assembly is used.

Simultaneous with the above, fluid in the bushing 70 flows through the groove 68 on the bearing surface 67 of the stem 56 and through the conduit 96 into the pressure chamber 94 to exert force on the working face of the piston 90. However, since the pilot valve 102 is open, the pressure in the pressure chamber 94 is vented across the valve seat 100 and through the cross-port 98 into the flow chamber 77. From the flow chamber 77 the vented fluid flows through cross-ports 78 into the interior of the boss 28 and through the recirculation port 34. By venting the fluid, the pressure in the pressure chamber cannot build up and cause the bypass valve 14 to close.

When the heater requires flow from the pump, a pressure differential across the main check valve 12 allows the inlet pressure to lift the valve disc member 42 from the valve seat 40. As the valve disc member 42 moves, the bearing surface 67 of the stem 56 moves away from the bearing surface 83 of the valve member 80 and no longer resists movement of the conduit 96. At this point, pressure in the pressure chamber 94 acts to seat the pilot valve member 102 on the pilot valve seat 100 so that the pressure is no longer vented, but builds up in the pressure chamber causing the valve member to move toward its closed position. If the demand flow requirement is such that the main check valve is open to a position wherein the valve disc member 42 has not yet reached the intermediate position, that is, has not moved a distance D and the demand requirement of the heater is less than the desired minimum output of the pump, the end of the conduit 96 will eventually bear on the bearing surface 67 of the stem 56 such that further movement of the valve member 80 causes the pilot valve member 102 to unseat allowing pressure in the pressure chamber 94 to be vented past the pilot valve seat 102 and through the cross-port 98. When the pressure in the pressure chamber 94 drops the valve member moves toward the closure member 30 causing the pilot valve seat 100 to engage the pilot valve member 102 allowing the pressure to build up in the pressure chamber moving the piston 90 toward the stem 56 allowing the pilot valve seat 100 to move away from the valve seat, etc. This oscillation can repeat several times, but eventually a steady state position will be assumed with the bypass valve 14 only partially open.

If the demand flow requirement is such that the valve disc member 42 reaches its intermediate position, that is has moved a distance D where the demand flow requirement equals the minimum pump output, the bypass valve 14 will close because the end of the conduit 96 will not engage the bearing surface 67 of the stem 56 and, thus, the pilot valve member 102 will not be unseated. Thus, movement of the valve member will continue until the inclined surface 86 seats on te valve seat 72 preventing further flow through the bypass valve 14. Beyond the intermediate position of the main check valve 12 its operation is in accordance with the demand flow requirement of the heater and the bypass valve 14 remains closed. If, however, the demand flow requirement drops below the minimum output of the pump, the valve disc member 42 moves toward the valve seat 40 and the bearing surface 67 of the stem 56 bears against the end of the conduit 96 unseating the pilot valve member 102 and allowing the valve member to move to a position wherein the bypass valve member 14 is partially open. If the main check valve 12 does not close, the pilot valve member 102 and the valve seat 100 oscillate as previously explained; if the main check valve 12 closes, the bypass valve 14 is moved to its fully open position.

Figure 5:
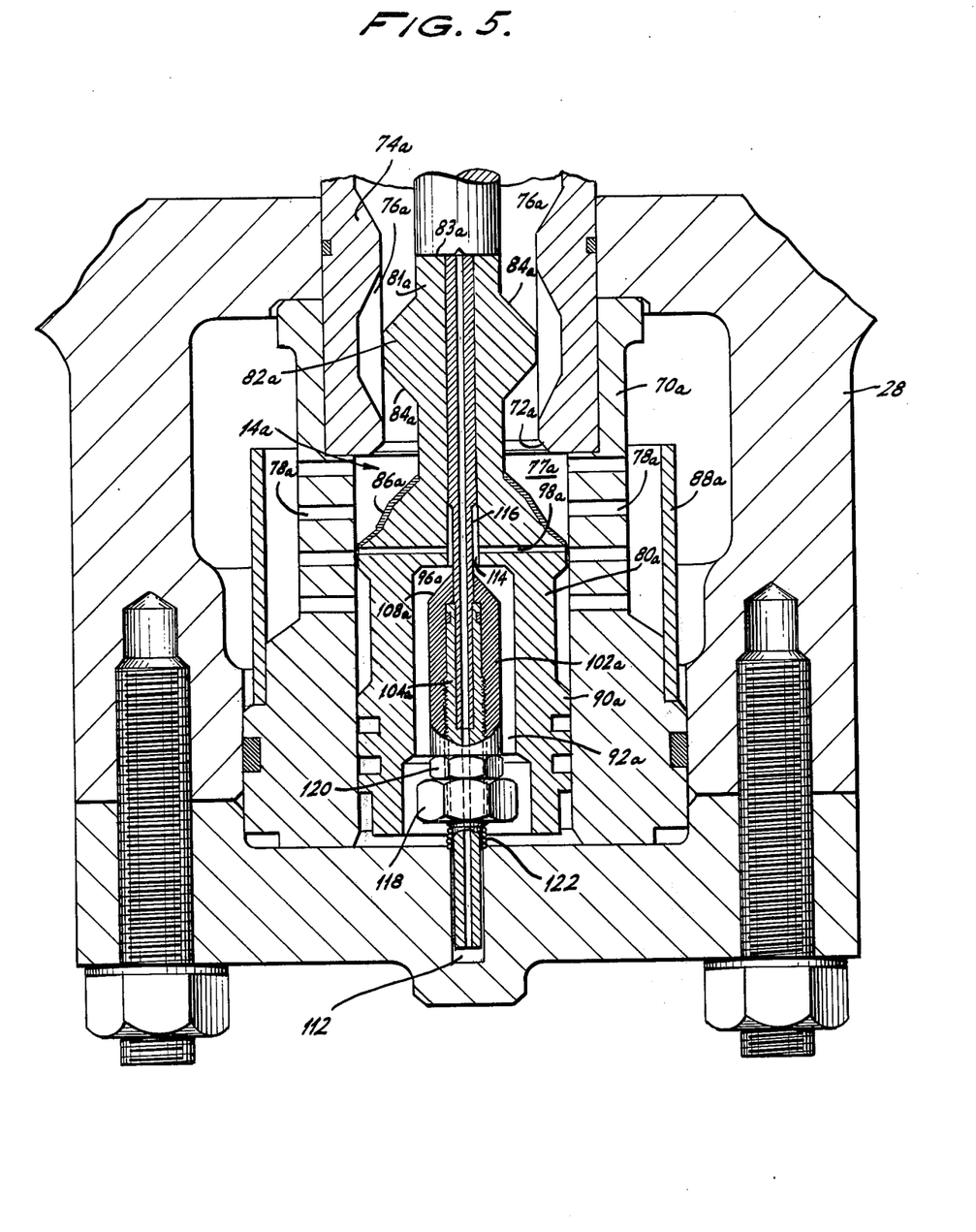
FIG. 5 is an enlarged sectional view of another form of a bypass valve usable with a valve assembly in accordance with this invention.

Referring now to FIG. 5 of the drawing, another form of a bypass valve 14a including a modified form of pilot valve is disclosed ad is usable with the main check valve 12 disclosed in FIGS. 1—4 of the drawings to provide another embodiment of a valve assembly in accordance with this invention. Because the main check valve 12 is the same as that disclosed in FIGS. 1—4, it is not illustrated in FIG. 5 of the drawing and when the structure comprising the main check valve is referred to in the following description, the reference numerals utilized in FIGS. 1—4 of the drawing will also be utilized; because of the similarities between the bypass valve 14a disclosed in FIG. 5 and that disclosed in FIGS. 1—4 of the drawing, like reference numerals will be utilized for similar parts with the suffix a attached. The bypass valve 14a includes a bushing 70a extending upwardly from the end surface of the closure member 30a so that the interior of the bushing communicates with the internal flow passage 54 in the valve disc member 42. Similar to the embodiment in FIGS. 1—4 of the drawing, the bushing 70a is formed with a valve seat 72a, a reduced diameter portion 74a having axially extending slots 76a, a flow chamber 77a and a plurality of cross-ports 78a in communication with the recirculation part 34. Adjacent the cross-ports 78a, the bushing 70a carries a wear plate 88a similar to wear plate 88.

Slidably received in the bushing 70a is a valve member 80a which is similar to valve member 80 disclosed in FIGS. 1—4 of the drawing. The valve member 80a thus includes a generally cylindrical end portion 81a having a bearing surface 83a, a land portion 82a having inclined end faces 84a cooperating with the slots 76a for throttling fluid from the inlet passage of the valve assembly. Spaced from the land portion 82a is an inclined surface 86a that cooperates with the valve seat 72a to allow or prevent, depending on its position, the flow of fluid into the flow chamber 77a, through the cross-ports 78a, against the wear plate 88a and finally through the recirculation port 34 to the feedwater pump.

Similar to the embodiment of the invention disclosed in FIGS. 1—4 of the drawing, movement of the bypass valve 14a between its opened and closed positions is controlled in accordance with the position of the main check valve 12 so that flow through the bypass valve varies inversely with flow through the main check valve until the latter reaches its intermediate position at which position the bypass valve is closed. To control the position of the bypass valve 14a the valve member 80a is formed with a piston 90a which is slidably received in the bushing 70a and which is formed with a counterbored opening 92a. The counterbored opening 92a and the inside wall of closure member 30a define a pressure chamber 94a that communicates through a cross-port 98a with the flow chamber 77a. The pressure chamber 94a also communicates with another pressure chamber 112 formed in the closure member 30a which will be fully explained hereinafter. At this point, it is noted that the valve member 80a is formed with an axially extending opening 114 forming a approxiamtely right angle with the end wall of the counterbored opening 92a and which receives in sliding relationship therewith a conduit 96a in the form of a hollow rod. Intermediate its ends, conduit 96a is formed with a reduced outer diameter portion 116 located, at least partially, within the opening 114 to form a flow path from the pressure chamber 94a to cross-ports 98a and, thus, flow chamber 77a. Controlling the flow of fluid from pressure chamber 94a to the cross-ports 98a is a pilot valve member 102a having an inclined end surface 108a that cooperates with the end of the opening 114 adjacent the end wall of the counterbored opening 92a to allow or prevent the flow of fluid from the pressure chamber 94a to the cross-ports 98a. The pilot valve member 102a is threadably carried on an outer threaded portion of a hollow bushing 104a having the same outer and inner diameters as the conduit 96a. Retaining the pilot valve member 102 on the bushing 104a is a lock nut 118 which bears on the end face of the pilot valve member adjacent a wrenching configuration 120 which may be gripped during the assembly and removal of the lock nut on the threaded portion of the bushing 104a.

The free end of the bushing 104a extends into the pressure chamber 112 with a slight radial clearance and, preferably, for reasons to be made clearer hereinafter, with a smaller clearance than that between the opening 114 and the reduced outer diameter portion 116 of the conduit 96a. Thus, the radial clearance between the end of the bushing 104a and the pressure chamber 112 defines a flow path from the pressure chamber 112 to the flow chamber 94a. A spring member 122 is provided and bears between the innerface of the closure member 30a and an inclined surface on the bushing member 104a adjacent the free face of the lock nut 118.

As noted previously, the inner and outer diameters of the end face of the conduit 96a adjacent the bearing surface 83 and of the bushing 104a are equal and thus define equal areas against which fluid pressure acts. The fluid pressure acting on the noted end of conduit 96a is substantially equal to that acting on the noted end of bushing 104a, there being only a slight pressure drop through the conduit 96a and bushing 104a, so that the forces developed by the fluid pressure and acting on the conduit and bushing are substantially balanced. It is now noted that the areas of the pilot valve member 102 a and the lock nut 118 on which pressure in pressure chamber 94a acts and the area on the conduit 96a in the opening 114 on which pressure can act are also selected so that the fluid pressure forces acting on the conduit 96a are substantially equal. Accordingly, the spring member 122 exerts the only force tending to close the pilot valve 102a, that is, the only force that tends to move the bushing 104a, pilot valve member 102a and conduit 96a toward the reduced diameter portion 66 of the stem 58 so that inclined surface 108a bears on the right angle edge between the opening 114 and the end wall of the counterbored opening 92a. Because of the generally right-angle relationship between the opening 114 and the end wall of the counterbored opening 92a, a line contact on the inclined surface 108a is provided when the pilot valve is closed and the fluid pressure forces on the conduit means 96a are substantially unchanged as the pilot valve opens or closes.

Operation of a valve assembly in accordance with this invention and including the bypass valve 14a disclosed in FIG. 5 of the drawing is generally similar to that disclosed in FIGS. 1—4 of the drawing. When the main check valve 12 is closed, the bearing surface 67 on the stem 56 is in bearing engagement with the bearing surface 83a on the valve member 80a and retains the valve member in a fully open position with land portion 82a and inclined surface 86a spaced from reduced diameter portion 74a and valve seat 72a, respectively by the distance D. The bearing surface 67 also works against spring member 122 holding the end of conduit 96a flush with the bearing surface 83a and maintaining pilot valve 102a open. With the pump operative and with the main check valve closed, output fluid from the pump flows through the inlet opening 18, radial opening 38, the flow passage 54 and through the interior of the bushing where its pressure is reduced as it is throttled through the slots 76a and then flows across the valve seat 72a into the flow chamber 77a. From the flow chamber 77a, the pressure is again reduced as the fluid flows through the cross-ports 78a and against the wear plate 88a into the interior of the cylindrical boss 28 from which it flows through the recirculation port 34. Simultaneous with the above-described flow, fluid also flows through the groove 68 in the bearing surface 67 of the stem and then through the conduit 96a to pressure chamber 112 and the flow passage between the end of the bushing 104a and the pressure chamber 112 and into the pressure chamber 94a. Because the pilot valve 102a is open, pressure in the chamber 94a is vented through the flow passage between the conduit 96a and the opening 114, the cross-ports 98a and into the flow chamber 77a. Since the flow passage communicating between the flow chamber 77a and the cross-ports 98a is larger than the flow passage communicating between the pressure chamber 112 and 94a, the fluid pressure is reduced.

When the heater requires flow from the pump, a pressure differential across the main check valve 12 allows the inlet pressure to lift the valve disc member 42 from the valve seat 40. As the valve disc 42 moves, the bearing surface 67 on the stem 56 moves away from the bearing surface 83a on the valve member 80a and no longer resists movement of the conduit 96a. The spring 122 exerts a force on the bushing 104a moving the conduit 96a until the inclined surface 108a on the pilot valve member 102a seats on the edge between the opening 114 and the end wall of counterbored opening 92a. With the pilot valve closed, pressure builds up in the pressure chamber 94a and acts on the piston 90a moving the valve member 80a toward the main check valve 12. If the main check valve has not opened to its intermediate position, the conduit 96a and the bearing surface 83a of the valve member 80a eventually bear against the bearing surface 67 on the stem 56. At this point, the conduit 96a is urged against the spring 122 toward the closure member 30a which moves pilot valve member 102a away from the opening 114 so that pressure in chamber 94a is again vented through the cross-ports 98a. At this point, land 82a is closer to the top end of the slots 76a reducing flow through the slots and past the valve seat 72a. Thus, the desired minimum output of the pump is maintained. It is noted that because the spring 122 exerts the closing force, the oscillation noted with respect to the FIGS. 1—4 embodiment is eliminated.

If the main check valve opens beyond its intermediate position, the pilot valve remains closed, the inclined surface 86a bears against valve seat 72a and the land 82a is beyond the end slots 76a. Thus the pump output flows through the main check valve and no portion is recirculated. If the demand flow requirement drops below the minimum output of the pump, the valve disc member 42 moves toward the seat 40, the bearing surface 67 on stem 56 seats on bearing surface 83a of the valve member 80a and conduit 96a moving the conduit toward the closure member 30a and opening the pilot valve. At this point pressure in chamber 94a is again vented allowing the bypass valve 14a to open.

In view of the foregoing, it should be clear that a modulating valve assembly has been provided that includes a main check valve and a bypass valve operative to maintain a minimum flow from a pump. It should also be clear that the operation of the bypass valve is independent of the operation of the main check valve, that is, the main check valve and the bypass valve cannot both close in the event of a malfunction and, finally, it should be clear that fluid is progressively metered between the two valves so that abrupt changes in the output of the pump or other pressure source are avoided.

While in the foregoing there has been described a preferred embodiment of the invention, it should be obvious to one skilled in the art that various changes and modifications can be made within the true spirit and scope of the invention as recited in the appended claims.

I claim:

1. A modulating flow control valve assembly including main check valve means movable between a fully closed and a fully open position in response to flow of fluid from a pressure source to a demand system and including an intermediate position wherein the fluid flow to said demand system corresponds to a preselected minimum flow from said pressure source, and bypass valve means for controlling the flow of fluid from said pressure source to a recirculation system, said bypass valve means having a fully open position when said main check valve means is in its fully closed position and being movable to a fully closed position when said main check valve means is in its intermediate position, piston means operatively associated with said bypass valve means, said piston means being in fluid communication with the inlet side of said main check valve means whereby pressure at inlet side of said main check valve means is operative in moving said bypass valve means between said fully open and fully closed positons, pilot valve means for controlling the pressure acting on said piston means.

2. A modulating flow control valve assembly in accordance with claim 1 including pilot valve means having an open position when said bypass valve means is in an open position, said pilot valve means being movable to a closed position in response to the opening of said main check valve means.

3. A modulating flow control valve assembly in accordance with claim 2 wherein said pilot valve means is movable to its closed position by fluid pressure.

4. A modulating flow control valve assembly in accordance with claim 2 wherein said pilot valve means is movable to its closed position by spring means.

5. A modulating flow control valve assembly in accordance with claim 1 including pressure reducing means assoicated with said bypass valve means.

6. A modulating flow control valve assembly including main check valve means movable between a fully closed and a fully open position in response to flow of fluid from a pressure source to a demand system and including an intermediate position wherein the fluid flow to said demand system corresponds to a preselected minimum flow from said pressure source, and bypass valve means for controlling the flow of fluid from said pressure source to a recirculation system, said bypass valve means having a fully open position when said main check valve means is in its fully closed position and being movable to a fully closed position when said main check valve means is in its intermediate position, piston means operatively associated with said bypass valve means, said piston means being in fluid communication with the inlet side of said main check valve means whereby pressure at inlet side of said main check valve means is operative in moving said bypass valve means between said fully open and fully closed valve means, conduit means slidably mounted through said bypass valve means and said piston means, said conduit means communicating at one end with the inlet side of said main valve means and at its other end with said piston means.

7. A modulating flow control valve assembly in accordance with claim 6 wherein said piston means is slidably received in a pressure chamber and wherein said pressure chamber communicates with said recirculation system through pilot valve means.

8. A modulating flow control valve assembly in accordance with claim 7 wherein said pilot valve means is fixed to said conduit means and is maintained in an open position when said bypass valve means is in its fully open position and said main check valve means is in its fully closed position, said pilot valve means being movable to its closed position when said main check valve means moves from its fully closed position.

9. A modulating flow control valve assembly in accordance with claim 8 wherein said main check valve means includes first bearing means bearing on second bearing means on said bypass valve means when said main check valve means is in its fully closed position whereby said conduit means is held in a position wherein said pilot valve means is open.

10. A modulating flow control valve assembly in accordance with claim 9 wherein said first bearing means moves out of engagement with said second bearing means when said main check valve means opens such that fluid pressure in said pressure chamber closes said pilot valve means allowing pressure in said chamber to move said bypass valve means toward its closed position.

11. A modulating flow control valve assembly in accordance with claim 9 including spring means biasing said pilot valve means to a closed position and wherein fluid pressure forces acting on said conduit means are balanced such that when said first bearing means moves out of engagement with said second bearing means said spring means closes said pilot valve means allowing pressure in said chamber to move said bypass valve means toward its closed position.

12. A modulating flow control valve assembly including a valve body formed with an inlet opening adapted to be connected to a source of fluid, an outlet opening adapted to be connected to a demand system and a recirculation port adapted to be connected to said source of fluid, said valve body being formed with a main check valve seat between said inlet and outlet openings and cooperating with a check valve disc responsive to the flow of fluid from said inlet opening to said outlet opening, said check valve disc being formed with a valve surface which prevents the flow of fluid when seated on said main check valve seat and being formed with a first tapered surface for metering the flow of fluid to an intermediate position of said check valve disc, said valve body including a bushing formed with a bypass received therein, said bypass valve member having a valve surface formed thereon for regulating the flow of fluid from said inlet opening to said recirculation port, said valve member having a first position wherein said bypass valve surface is spaced a distance from said bypass valve seat allowing maximum flow of fluid from said inlet opening to said recirculation port and a second position wherein said bypass valve surface is seating on said bypass valve seat to prevent the flow of fluid from said inlet opening to said recirculation port, the distance between said first and second positions of said bypass valve means being equal to the distance movable by said check valve disc between its fully closed position and its intermediate position, said check valve disc being formed with an extension member extending toward said bypass valve member and said bypass valve member being formed with an extension member extending toward said check valve disc, said extension members being in bearing engagement when said check valve disc is in its seated position on said main check valve seat and when said bypass valve member is in its fully open position, said bypass valve member including piston means slidably carried in a pressure chamber and having a working face in communication with pressure on the inlet side of said main check valve seat through conduit means slidably mounted through said bypass valve member and said piston means whereby fluid flows into said pressure chamber, said pressure chamber communicating with said recirculation port and a pilot valve carried on said conduit meas for controlling the flow of fluid from said pressure chamber to said recirculation port, said pilot valve being maintained in an open position by said extension member on said check valve disc bearing on said extension member on said bypass valve member and being movable to a closed position when said check valve disc moves from said main check valve seat, fluid pressure in said pressure chamber being operative when said pilot valve is closed to move said bypass valve toward its second position whereby flow through said bypass valve to said recirculation port varies inversely with flow through said main check valve to its intermediate position.

13. A modulating flow control valve assembly in accordance with claim 12 wherein said bushing is formed with slots and said bypass valve member is formed with a land whereby fluid flow to said recirculation port is throttled.

14. A modulating flow control valve assembly in accordance with claim 12 wherein radial ports reducing fluid pressure are interposed between said bypass valve seat and said recirculation port.

15. A modulating flow control valve assembly in accordance with claim 14 wherein a wear plate is interposed between said radial ports and said recirculation port.

16. A modulating flow control valve assembly in accordance with claim 12 wherein said pilot valve is movable toward said closed position by fluid pressure in said pressure chamber.

17. A modulating flow control valve assembly in accordance with claim 12 wherein one end of said conduit means communicates with a second pressure chamber in communication with the other pressure chamber and wherein the cross-sectional areas at the ends of said conduit means are substantially equal, such that fluid pressure forces acting on the ends of said conduit means are substantially balanced, and wherein the conduit means configuration is such that other fluid pressure forces acting thereon are also substantially balanced, whereby said pilot valve is movable toward said closed position by spring means operatively associated therewith.

18. A modulating flow control valve assembly in accordance with claim 17 wherein the flow path from said second pressure chamber to said other pressure chamber is smaller than the flow path between said other pressure chamber and said recirculation port whereby the pressure of said fluid is reduced.

19. A modulating flow control valve including main check valve means movable between a fully closed and a fully open position in response to flow of fluid from a pressure source to a demand system and including an intermediate position wherein the fluid flow to said demand system corresponds to a preselected minimum flow from said pressure source, and bypass valve means for controlling the flow of fluid from said pressure source to a recirculation system, said bypass valve means having a fully open position when said main check valve means is in its fully closed position and being movable to a fully closed position when said main check valve means is in its intermediate position, piston means operatively associated with said bypass valve means, said piston means being in fluid communication with the inlet side of said main check valve means whereby pressure at inlet side of said main check valve means is operative in moving said bypass valve means between said fully open and fully closed position, said main check valve means including a disc member and said bypass valve means including a valve member, said disc member and said valve member being movable relative to each other.

* * * * *